No. 721,609. PATENTED FEB. 24, 1903.
H. C. RYDING.
BOILER TUBE CLEANER.
APPLICATION FILED MAY 17, 1902.
NO MODEL
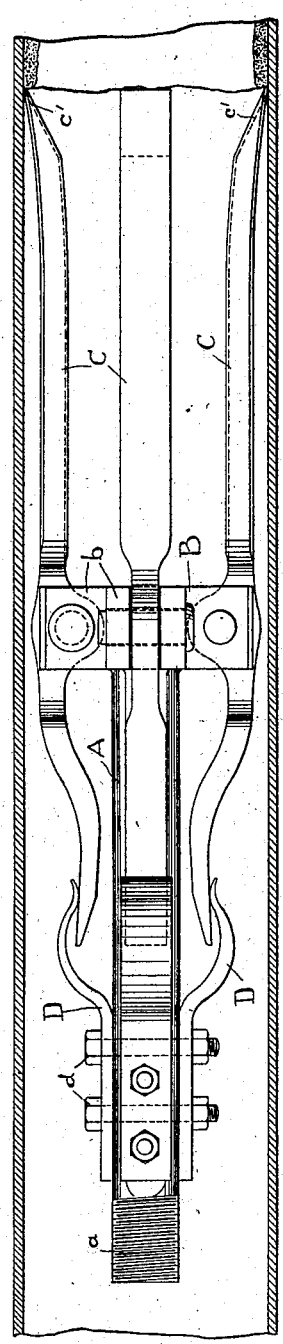
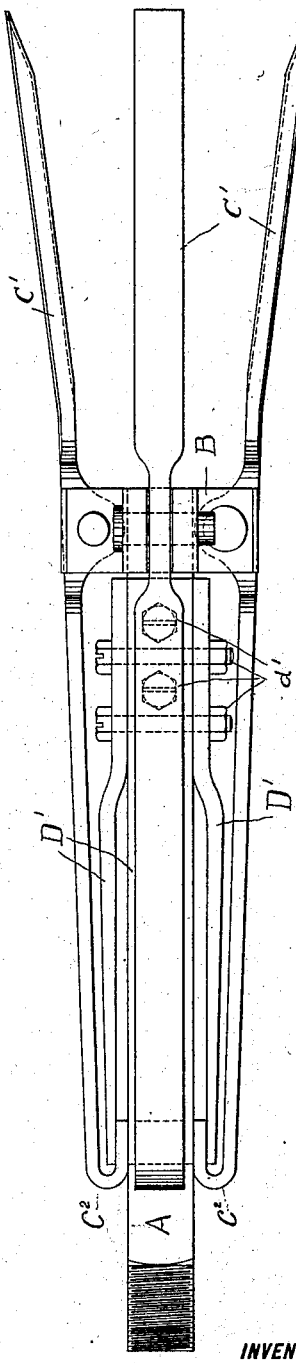
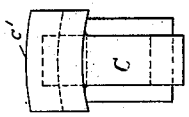
WITNESSES:
A. V. A. B. McCauley.
L. O'Connell,
INVENTOR
H. C. Ryding.
BY
Geo. H. Parmelee
his ATTORNEY.

UNITED STATES PATENT OFFICE.

HERBERT C. RYDING, OF ELYRIA, OHIO.

BOILER-TUBE CLEANER.

SPECIFICATION forming part of Letters Patent No. 721,609, dated February 24, 1903.

Application filed May 17, 1902. Serial No. 107,866. (No model.)

*To all whom it may concern:*

Be it known that I, HERBERT C. RYDING, of Elyria, in the county of Lorain and State of Ohio, have invented a new and useful Improvement in Boiler-Tube Cleaners, of which the following is a full, clear, and exact description, reference being had to the accompanying drawings, which form a part of this specification.

My invention has relation to certain new and useful improvements in boiler-tube cleaners, and is designed to provide a simple and effective implement which can be operated manually to quickly and thoroughly remove deposits of scale from the interior of boiler-tubes.

With this object in view my invention consists in the combination, with a suitable head or carrier, of a number of cutting-blades pivoted to said head or carrier intermediate of their ends and provided at their forward ends with chisel-like cutting edges which are forced outwardly by the action of springs which engage their opposite end portions, the whole being adapted for insertion and reciprocation by means of a suitable handle within the tube to be cleaned.

My invention also consists in the novel construction and combination of parts, all as hereinafter described, and pointed out in the appended claim, reference being had to the accompanying drawings, in which—

Figure 1 is a side view of a boiler-tube cleaner embodying my invention and shown as in use; Fig. 2, an end view of one of the cutting-blades, and Fig. 3 a side view showing a modification.

The letter A designates a suitable shank or stem threaded at $a$ for the attachment of a handle, and B is a head rigidly secured to the shank or stem. The head is formed with a number of radial arms $b$, (four in the present instance,) provided each with a slot $b'$ to seat the pivot portion of an elongated cutting-blade C. One of these blades is pivoted to each arm of the head intermediate of its ends, its longer arm being bent somewhat outwardly at $c'$ and ground transversely, as shown in Fig. 2, to adapt it to the interior of the tube. The rearwardly-extending arm of each of the cutting-blades is curved, as shown, and is engaged by a plate-spring D, which is secured to the shank or stem A. The springs by their pressure upon the shorter arms of the blades force the cutting edges outwardly into yielding engagement with the scale to be removed, as shown in Fig. 1.

The device is introduced into the tube to be cleaned and is manually reciprocated therein by means of the handle. (Not shown.) The cutting edges of the blades act to scrape out channels in the scale, and by slightly rotating the cleaner the scale remaining between the channels is readily dislodged by the pressure of the cutters. By adjusting the bolts $d$, which secure the springs, the action of the latter upon the cutters may be adjusted.

In the modification shown in Fig. 3 the rear arms of the cutter-blades C' are bent, as shown at $C^2$, for engagement with the springs D'.

I do not wish to limit myself to the precise construction and arrangement of the parts as herein shown and described, as various changes may be made in the details thereof without departing from my invention.

Having thus described my invention, what I claim as new, and desire to secure by Letters Patent, is—

A boiler-tube cleaner comprising a central stem, a head fixed thereto and having a plurality of radial slotted arms, cutting-blades pivoted intermediately of their ends in the slots of said arms and terminating each at one end in a chisel-like cutting edge, and a number of springs secured to the said stem and each bearing inwardly upon one of the cutting-blades at the rear of its pivot, whereby the cutting edges of said blade are forced outwardly at an angle to the said stem.

In testimony whereof I have affixed my signature in presence of two witnesses.

HERBERT C. RYDING.

Witnesses:
 JNO. GARD,
 BENJ. BEVANS.